US012746985B2

(12) United States Patent
Wright et al.

(10) Patent No.: US 12,746,985 B2
(45) Date of Patent: Sep. 29, 2026

(54) MANUAL AERODYNAMIC SYSTEM FOR A VEHICLE AND METHOD OF CONTROLLING THE SAME

(71) Applicant: GM Global Technology Operations LLC, Detroit, MI (US)

(72) Inventors: Jacob Wright, Grosse Pointe Woods, MI (US); Ling Xiao, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 131 days.

(21) Appl. No.: 18/795,829

(22) Filed: Aug. 6, 2024

(65) Prior Publication Data

US 2026/0042493 A1 Feb. 12, 2026

(51) Int. Cl.
*B62D 35/00* (2006.01)
*B62D 37/02* (2006.01)

(52) U.S. Cl.
CPC ......... *B62D 35/005* (2013.01); *B62D 35/007* (2013.01); *B62D 37/02* (2013.01)

(58) Field of Classification Search
CPC ..... B62D 35/005; B62D 35/007; B62D 37/02
See application file for complete search history.

(56) References Cited

U.S. PATENT DOCUMENTS

| | | | | |
|---|---|---|---|---|
| 10,189,513 | B2 | 1/2019 | Heil | |
| 2017/0088200 | A1* | 3/2017 | Heil | B62D 37/02 |
| 2017/0151984 | A1* | 6/2017 | Bray | B62D 37/02 |
| 2019/0100194 | A1* | 4/2019 | Fahland | B60W 30/18109 |
| 2023/0039754 | A1 | 2/2023 | Bartels | |

FOREIGN PATENT DOCUMENTS

| | | | |
|---|---|---|---|
| DE | 102016218182 A1 * | 3/2017 | B62D 35/007 |

* cited by examiner

*Primary Examiner* — Lori Lyjak
(74) *Attorney, Agent, or Firm* — Honigman LLP; Matthew H. Szalach

(57) ABSTRACT

An aerodynamic system for a vehicle, comprising one or more aerodynamic devices arranged on the vehicle, the one or more aerodynamic devices each having a plurality of device positions, and a lever communicatively coupled to the one or more aerodynamic devices and configured to be manually actuated to control the plurality of device positions of the aerodynamic devices.

20 Claims, 5 Drawing Sheets

MANUAL AERODYNAMIC SYSTEM FOR A VEHICLE AND METHOD OF CONTROLLING THE SAME

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to an aerodynamic system for a vehicle.

In general, vehicles can include one or more aerodynamic elements. The aerodynamic elements can affect vehicle drag, wind noise emissions, lift forces that affect traction, cornering, and other aspects of vehicle stability. Vehicles can include passive aerodynamic elements, active aerodynamic elements, or a combination of active and passive aerodynamic elements. Systems that include active aerodynamic elements can be complex (e.g., require several sensors, computers, wire harnesses, etc.) and, thus, are difficult to deploy across a fleet of vehicles. Shortcomings of existing systems are addressed by one or more aspects of the present disclosure.

SUMMARY

In one configuration, a vehicle is provided and includes a vehicle body including an interior and an exterior, the exterior including a front end and a rear end spaced from the front end. The vehicle including one or more aerodynamic devices coupled to the vehicle body and configured to move between a plurality of device positions with respect to the vehicle. The vehicle further including one or more actuators coupled to each of the of one or more aerodynamic devices and configured to position the one or more aerodynamic devices at the plurality of device positions. The vehicle further including a lever arranged in the interior of the vehicle body and communicatively coupled to the one or more actuators, the lever is configured to move between a plurality of lever positions with respect to the vehicle. The plurality of lever positions correspond with the plurality of device positions.

The vehicle may include one or more of the following optional aspects. For example, the one or more aerodynamic devices includes one or more wings coupled to the vehicle body at the rear end. The one or more aerodynamic devices can further include one or more flaps coupled to the vehicle body at the front end.

According to at least one aspect, the one or more actuators include at least one hydraulic actuator.

According to another aspect, the plurality of device positions includes a first device position and a second device position and the plurality of lever positions includes a first lever position and a second lever position. The first lever position can correspond with the first device position and the second lever position can correspond with the second device position. The first device position includes a high drag position and the second device position includes a low drag position.

According to at least one example, the plurality of device positions includes a high drag position and a low drag position. The lever further includes a biasing member that biases the lever toward the high drag position.

According to another example, the vehicle further includes a vehicle dynamics module communicatively coupled to one or more actuators and configured to limit an input from the lever to maintain balance of the vehicle.

In another configuration, an aerodynamic system for a vehicle is provided and includes one or more aerodynamic devices arranged on the vehicle, the one or more aerodynamic devices each having a plurality of device positions, and a lever communicatively coupled to the one or more aerodynamic devices and configured to be manually actuated to control the plurality of device positions of the aerodynamic devices.

The aerodynamic system may include one or more of the following optional aspects. For example, the one or more aerodynamic devices include a first aerodynamic device configured for an underside of the vehicle and a second aerodynamic device configured for an upper side of the vehicle. The plurality of device positions includes a first device position that increases downforce on the vehicle and a second device position that reduces downforce on the vehicle.

According to at least one aspect, the lever further includes a plurality of lever positions that correspond with the plurality of device positions.

According to another aspect, the aerodynamic system includes a dial that is communicatively coupled to the lever and is configured for adjusting actuation of the one or more aerodynamic devices.

According to at least one example, the lever includes a pedal that is arranged adjacent to a brake pedal and an accelerator pedal.

In yet another configuration, a method of controlling a manual aerodynamic system of a vehicle is provided. The method includes providing one or more aerodynamic devices on an exterior of a vehicle, providing a lever in an interior of the vehicle that is communicatively coupled to the one or more aerodynamic devices, moving the lever between a plurality of lever positions, communicating the plurality of lever positions to one or more actuators that are communicatively coupled to the one or more aerodynamic devices, and actuating one or more aerodynamic devices between a plurality of device positions via the one or more actuators based on the plurality of lever positions.

The method may include one or more of the following optional aspects or steps. For example, the method further includes limiting actuation of the one or more actuators based on an input from a vehicle dynamics module.

According to at least one aspect, moving the lever between the plurality of lever positions further includes moving a handle arranged in an interior of the vehicle.

According to another aspect, moving the lever between the plurality of lever positions further includes moving a pedal arranged in an interior of the vehicle.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
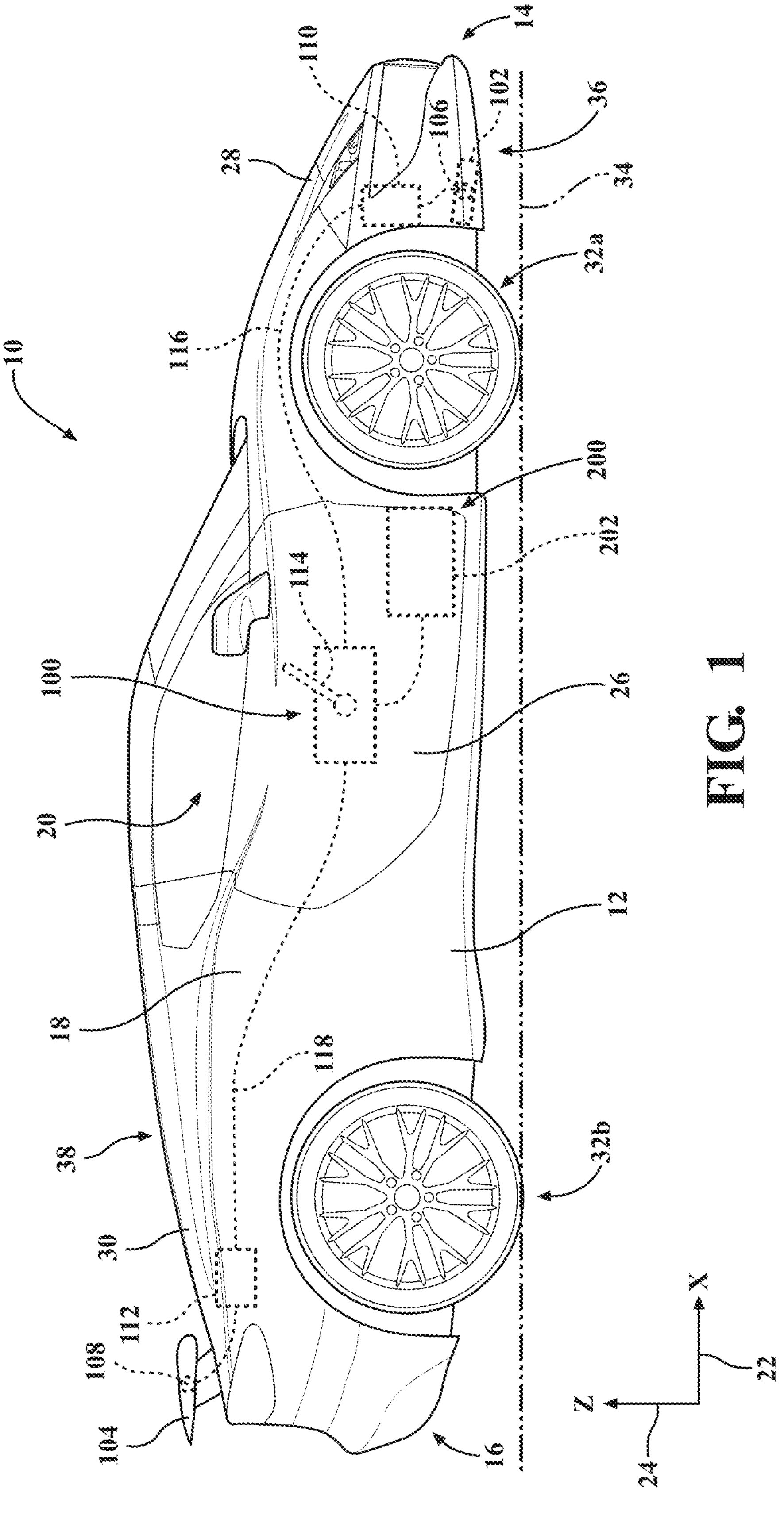
FIG. 1 is a side view of a vehicle including an aerodynamic system according to principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising." "including." and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first." "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC): a digital, analog, or mixed analog/digital discrete circuit: a digital, analog, or mixed analog/digital integrated circuit: a combinational logic circuit: a field programmable gate array (FPGA): a processor (shared, dedicated, or group) that executes code: memory (shared, dedicated, or group) that stores code executed by a processor: other suitable hardware components that provide the described functionality: or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application." an "app." or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory. Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry. e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data. e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices: magnetic disks, e.g., internal hard disks or removable disks: magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a key board and a pointing device, e.g., a mouse or a trackball, by which the user can provide input to the computer. Other kinds of devices can be used to provide interaction with a user as well: for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user: for example, by sending web pages to a web browser on a user's client device in response to requests received from the web browser.

Including aerodynamic elements, especially active aerodynamic elements, on a vehicle can be complex, add considerable weight to the vehicle, and/or increase cost of the vehicle. As will be discussed below, active aerodynamic elements that are manually controlled by a user of the vehicle alleviate at least some of these challenges. Additionally, active aerodynamic elements that are manually controlled can enhance and provide an opportunity for the user to engage with their driving experience.

With reference to FIG. 1, an illustrative example of a vehicle 10 is provided and includes a vehicle body 12. The vehicle body 12 includes a first or front end 14 and a second or rear end 16 spaced from the front end 14. Additionally, the vehicle body 12 defines an exterior 18 and an interior 20 of the vehicle 10. The vehicle body 12 extends along a longitudinal axis 22 (i.e., fore-aft direction), along a vertical axis 24, and along a lateral axis (i.e., cross car) that extends into the page. The exterior 18 can be defined by one or more closures, such as one or more doors 26, a front hood 28, and a rear hood 30. Additionally, one or more front wheels *32a* are coupled to the vehicle body 12 at the front end 14 and one or more rear wheels *32b* are coupled to the vehicle body 12 at the rear end 16 so that the vehicle 10 can travel with respect to a ground surface (i.e., a road) 34. In the present illustrative example, the vehicle 10 includes an underside (e.g., undercarriage) 36 that faces the ground surface 34 and an upper side 38 that includes at least a portion of the vehicle body 12 and faces away from the ground surface 34.

The vehicle 10 includes an aerodynamic system 100 that can be configured to improve vehicle performance during travel and/or provide opportunities for user engagement and manual control over aspects of the vehicle 10 (i.e., enhance driver experience), for example. With continued reference to FIG. 1, the aerodynamic system 100 includes one or more aerodynamic devices coupled to the vehicle body 12. For instance, the aerodynamic system 100 can include one or more first aerodynamic devices or flaps 102 arranged at or coupled to the front end 14 of the vehicle 10 and one or more second aerodynamic devices or wings 104 arranged at or coupled to the rear end 16 of the vehicle 10. The one or more flaps 102 may be referred to as gurney flaps and can be configured to be coupled to a portion of the underside 36 at the front end 14. Additionally, the flaps 102 can be configured to be movable between a plurality of first device positions with respect to the vehicle 10 and about a first device axis 106 that can extend cross-car and generally parallel to the lateral axis. The one or more wings 104 can be arranged at or coupled to the rear end of the vehicle 10. More particularly, the one or more wings 104 can be configured to be coupled to the upper side 38 and are movable between a plurality of second device positions with respect to the vehicle 10. Similar to the one or more flaps 102, the one or more wings 104 are arranged with respect to and are movable about a second device axis 108 that extends cross-car and is generally parallel to the lateral axis.

The plurality of first and second device positions can include a first or high drag position (FIG. 2) and a second or low drag position (FIG. 3), as well as an infinite number of positions between the high drag position and the low drag position. In the present illustrative example, the high drag position (FIG. 2) can be a default position for the one or more flaps 102 and the one or more wings 104. In the high drag position (FIG. 2), the one or more flaps 102 and the one or more wings 104 can be positioned with a first angle of attack (i.e., tilt) that increases a downforce on the vehicle 10 and pressure on the front and/or rear wheels 32*a*. 32*b*. In the low drag position (FIG. 3), the one or more flaps 102 and the one or more wings 104 can be positioned with a second angle of attack (i.e., tilt) that reduces the downforce on the vehicle 10 and pressure on the front and/or rear wheels 32*a*. 32*b*. According to one aspect, as will be discussed below; the position of the one or more flaps 102 and/or the position of the one or more wings 104 can be controlled independent from one another.

With continued reference to FIG. 1, the aerodynamic system 100 can include one or more actuators coupled to each of the one or more flaps 102 and the one or more wings 104 and are configured to move the one or more flaps 102 and the one or more wings 104 between the plurality of first and second device positions. In the present illustrative example, the one or more actuators are hydraulic, however, other non-hydraulic actuators can be used as well. According to one aspect, the one or more actuators include a first actuator 110 and a second actuator 112 that are each communicatively coupled to a lever 114 arranged within the interior 20 of the vehicle 10. For instance, a first hose or tube 116 can be coupled to the first actuator 110 and the lever 114 and a second hose or tube 118 can be coupled to the second actuator 112 and the lever 114. Thus, actuation or movement of the lever 114 can provide an input to the first and/or second actuators 110, 112 to actuate the one or more flaps 102 and/or the one or more wings 104.

Figure 2:
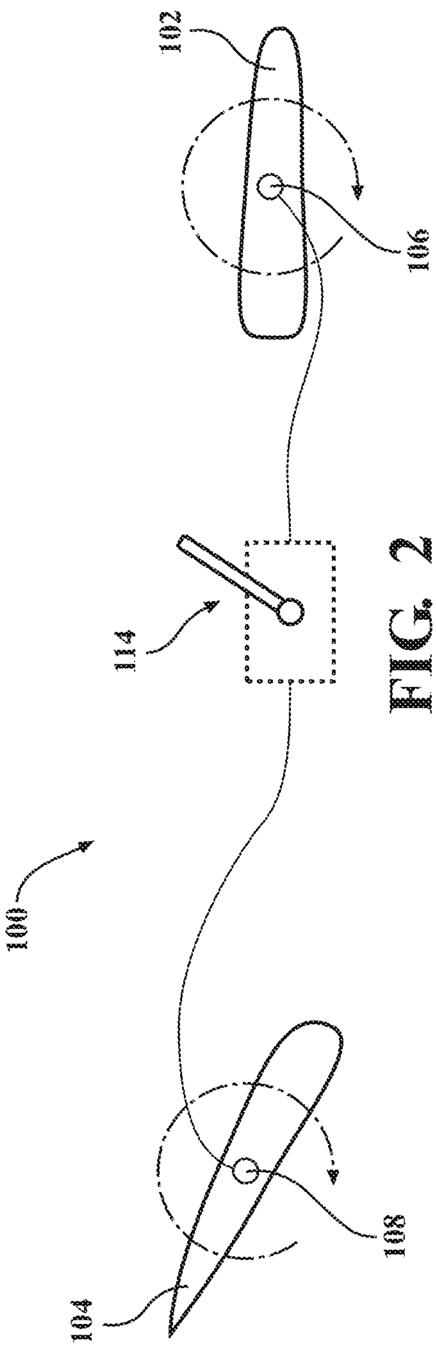
FIG. 2 is a schematic view of the aerodynamic system of FIG. 1 including a first aerodynamic device and a second aerodynamic device in a first position.
Figure 3:
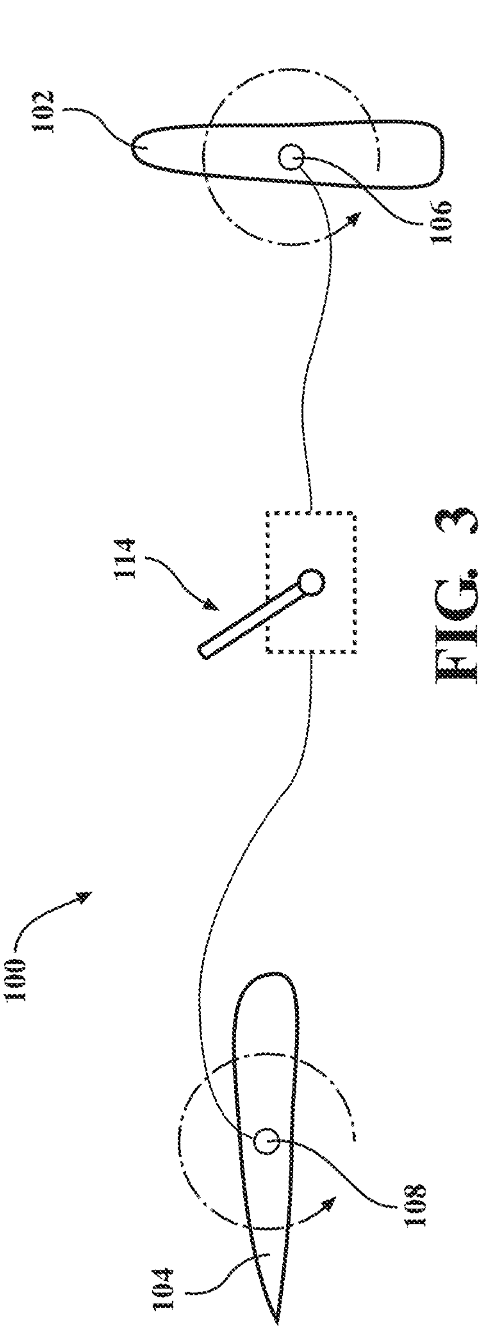
FIG. 3 is a schematic view of the aerodynamic system of FIG. 1 including a first aerodynamic device and a second aerodynamic device in a second position.

With reference to FIGS. 2 and 3, the lever 114 can be configured to move between a plurality of lever positions with respect to the vehicle 10. The plurality of lever positions can include a first lever position (FIG. 2) and a second lever position (FIG. 3), as well as an infinite number of lever positions between the first lever position and the second lever position. According to one aspect, the plurality of lever positions can correspond with the plurality of device positions. In other words, the first lever position can correspond with the high drag position (FIG. 2) and the second lever position can correspond with the low drag position (FIG. 3). According to one aspect, the lever 114 can be equipped with a spring (not shown) that biases the lever 114 toward the first lever position (FIG. 2) so that the default position of the one or more flaps 102 and the one or more wings 104 is in the high drag position (FIG. 2), for example.

Figure 4:
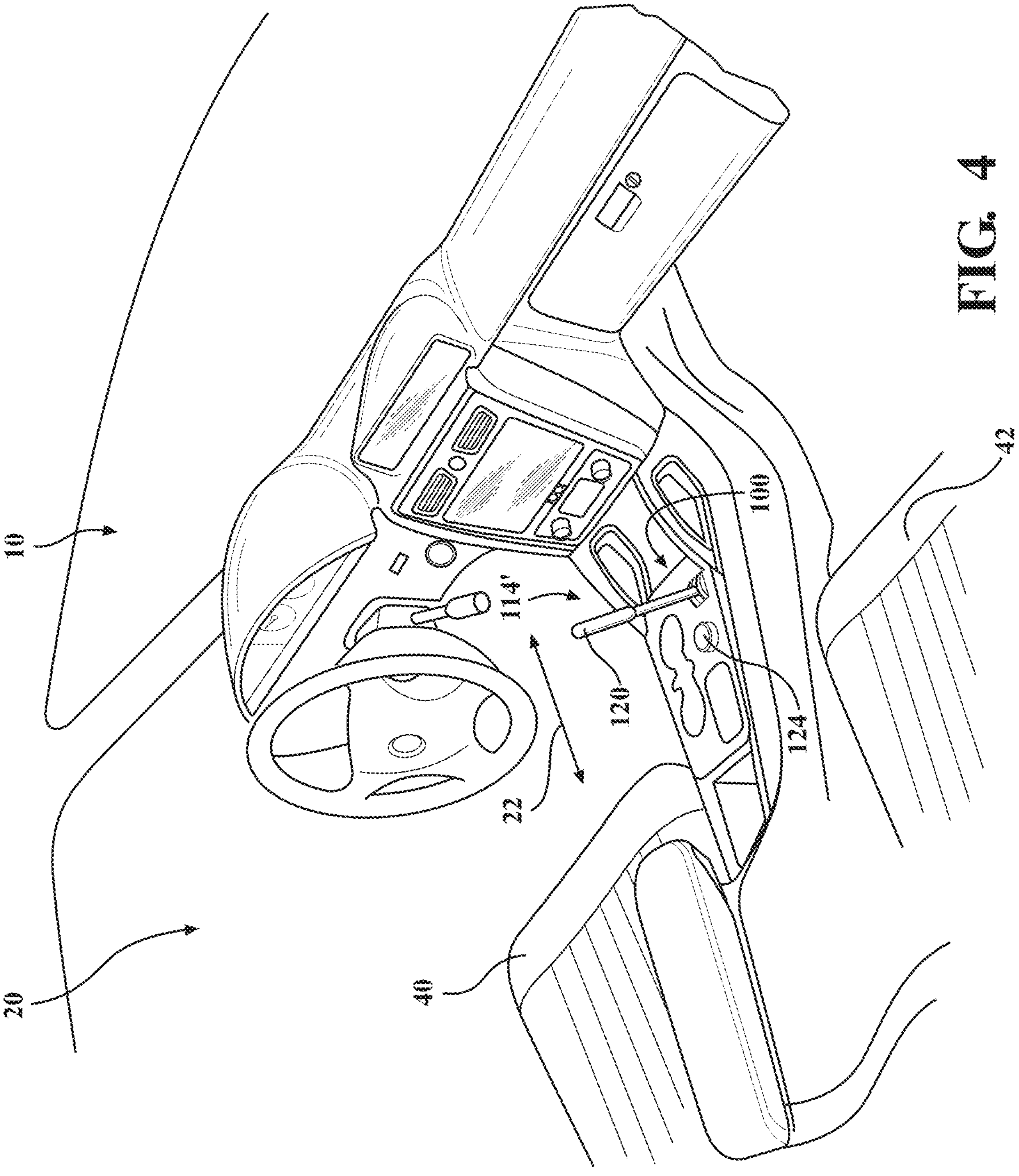
FIG. 4 is a perspective view of an interior of the vehicle of FIG. 1 including a first configuration of a lever for controlling the aerodynamic system.

In one configuration, with reference to FIG. 4, the lever 114' is arranged in the interior 20 of the vehicle 10 between a first or driver's side seat 40 and a second or passenger side seat 42. In other words, the lever 114' can be arranged in the interior 20 of the vehicle 10 so that a user can access the lever 114' with their hand, for example. The lever 114' includes a handle 120 that the user can grip and move the lever 114' fore-aft with respect to the longitudinal axis 22.

Figure 5:
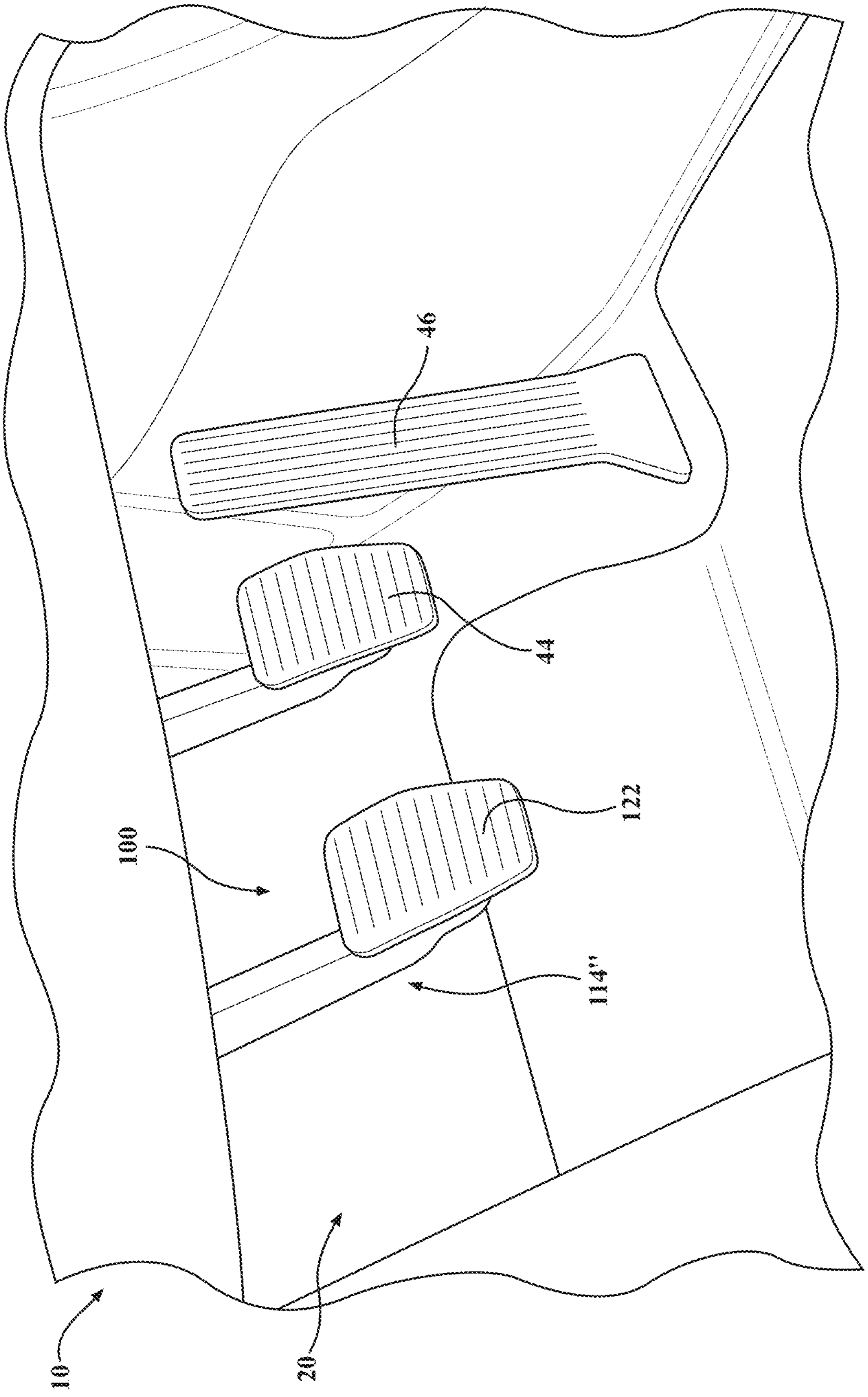
FIG. 5 is a perspective view of an interior of the vehicle of FIG. 1 including a second configuration of a lever for controlling the aerodynamic system.

In another configuration, with reference to FIG. 5, the lever 114' is arranged in the interior 20 of the vehicle 10 and includes a pedal 122 that is arranged adjacent a brake pedal 44 and an accelerator pedal 46. During travel, the user can engage with the aerodynamic system 100 by pressing and releasing the pedal 122 with one of their feet, for example.

According to at least one aspect, the aerodynamic system 100 can also include a mixer or dial 124 that is communicatively coupled to the lever 114 or to the one or more actuators (i.e., the first actuators 110 and/or the second actuators 112) so that the user can select or customize the effect of the lever 114 with respect to the one or more flaps 102 and/or the one or more wings 104. For instance, the dial 124 can be configured so that movement of the lever 114 only moves the one or more flaps 102 or the one or more wings 104. In other words, the dial 124 may be configured so that movement of the lever 114 resus in more downforce on the rear wheels 32*b* or more downforce on the front wheels 32*a*.

With reference again to FIG. 1, the vehicle 10 can include a vehicle management system 200 that includes one or more modules that are configured to process data obtained from one or more sensors (not shown) arranged within or on the vehicle 10. For instance, one of the modules may include a vehicle dynamics module 202 that is configured to receive, store, and/or process data obtained by the one or more sensors to determine dynamic pressure on the vehicle 10, for example. The vehicle dynamics module 202 may be configured to maintain balance of the vehicle 10 during travel. In other words, the vehicle dynamics module 202 may be configured to limit operation of the lever 114 or limit, restrict, and/or modify the input from the lever 114 to the one or more actuators 112. The vehicle dynamics module 202 may be desirable to prevent oversteer, for example.

Figure 6:
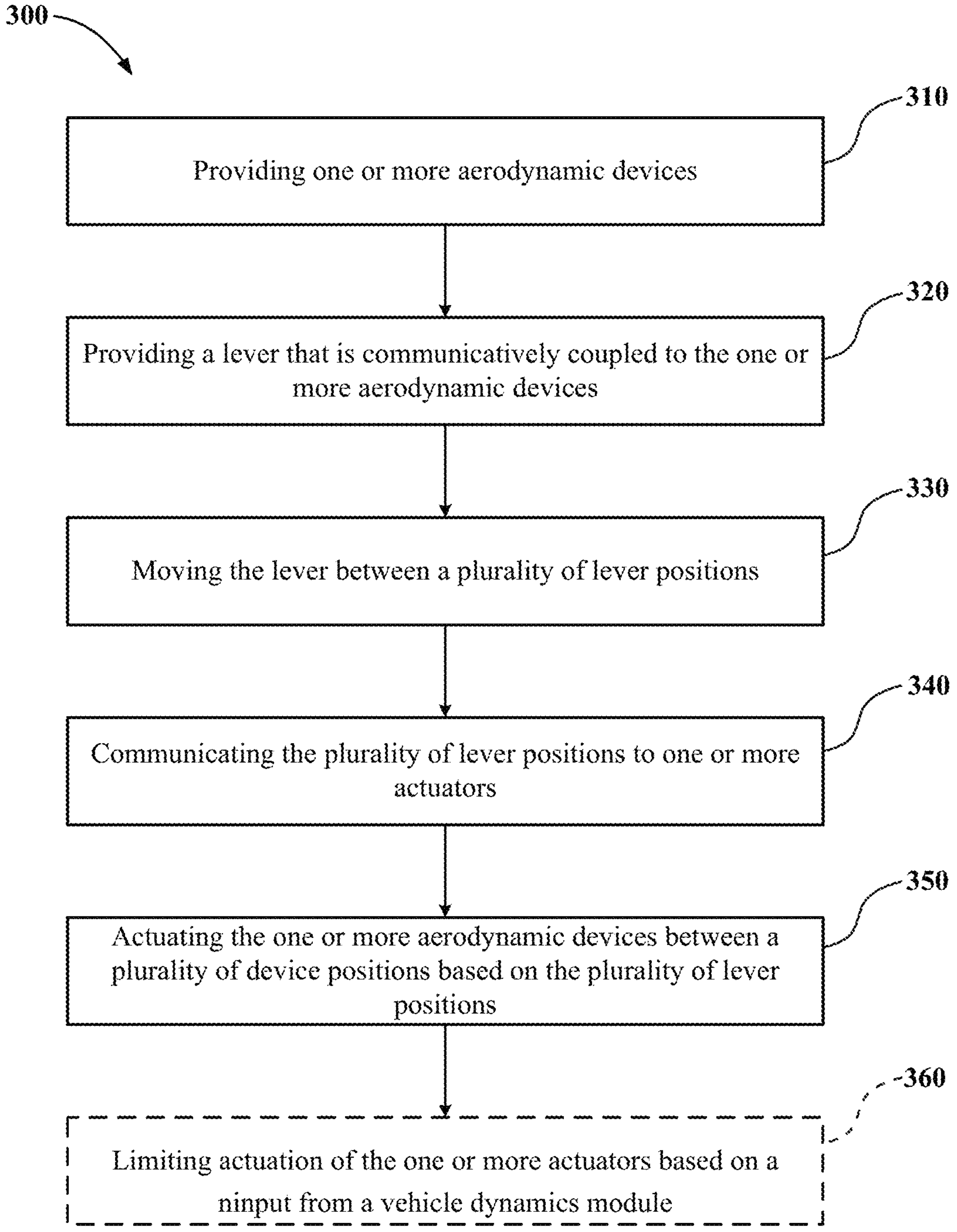
FIG. 6 is a flow diagram of a method of controlling a manual aerodynamic system of a vehicle according to principles of the present disclosure.

With reference to FIG. 6, a method 300 of controlling a manual aerodynamic system for a vehicle is provided. At 310, the one or more aerodynamic devices can be arranged on the exterior 18 of the vehicle 10. In other words, the one or more flaps 102 and/or the one or more wings 104 can be arranged on the underside 36 or on the upper side 38 of the vehicle.

At 320, the lever 114 is arranged in the interior 20 of the vehicle 10 and is communicatively coupled to the one or more aerodynamic devices (e.g., the one or more flaps 102 and/or the one or more wings 104).

At 330, the lever 114 can be moved between the plurality of lever positions. Moving the lever 114 can include moving the handle 120 (FIG. 4) or a pedal 122 (FIG. 5) arranged in the interior 20 of the vehicle 10, for example.

At 340, the plurality of lever position can be communicated directly to the one or more aerodynamic devices or to one or more actuators that are communicatively coupled to the one or more aerodynamic devices.

At 350, the one or more actuators actuate (i.e., move) the one or more aerodynamic devices between the plurality of device positions based on the plurality of lever positions.

At 360, the method 300 can further include limiting actuation of the one or more actuators 112 based on an input from the vehicle dynamics module 202.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A vehicle, comprising:

a vehicle body including an interior and an exterior, the exterior including a front end and a rear end spaced from the front end;

one or more aerodynamic devices coupled to the vehicle body and configured to move between a plurality of device positions with respect to the vehicle;

one or more actuators coupled to each of the of one or more aerodynamic devices and configured to position the one or more aerodynamic devices at the plurality of device positions; and a lever arranged in the interior of the vehicle body and communicatively coupled to the one or more actuators, the lever being configured to move between a plurality of lever positions with respect to the vehicle, the plurality of lever positions corresponding with the plurality of device positions.

2. The vehicle of claim 1, wherein the one or more aerodynamic devices include one or more wings coupled to the vehicle body at the rear end.

3. The vehicle of claim 2, wherein the one or more aerodynamic devices include one or more flaps coupled to the vehicle body at the front end.

4. The vehicle of claim 1, wherein the one or more actuators include at least one hydraulic actuator.

5. The vehicle of claim 1, wherein the plurality of device positions includes a first device position and a second device position and the plurality of lever positions includes a first lever position and a second lever position.

6. The vehicle of claim 5, wherein the first lever position corresponds with the first device position and the second lever position corresponds with the second device position.

7. The vehicle of claim 6, wherein the first device position includes a high drag position and the second device position includes a low drag position.

8. The vehicle of claim 1, wherein the plurality of device positions includes a high drag position and a low drag position.

9. The vehicle of claim 8, wherein the lever further includes a biasing member that biases the lever toward the high drag position.

10. The vehicle of claim 1, further comprising a vehicle dynamics module communicatively coupled to the one or more actuators and configured to limit an input from the lever to maintain balance of the vehicle.

11. An aerodynamic system for a vehicle, comprising:

one or more aerodynamic devices arranged on the vehicle, the one or more aerodynamic devices each having a plurality of device positions; and a lever communicatively coupled to the one or more aerodynamic devices and configured to be manually actuated to control the plurality of device positions of the one or more aerodynamic devices.

12. The aerodynamic system of claim 11, wherein the one or more aerodynamic devices include a first aerodynamic device configured for an underside of the vehicle and a second aerodynamic device configured for an upper side of the vehicle.

13. The aerodynamic system of claim 12, wherein the plurality of device positions includes a first device position that increases downforce on the vehicle and a second device position that reduces downforce on the vehicle.

14. The aerodynamic system of claim 11, wherein the lever further comprises a plurality of lever positions that correspond with the plurality of device positions.

15. The aerodynamic system of claim 11, wherein the aerodynamic system includes a dial that is communicatively coupled to the lever and is configured for adjusting actuation of the one or more aerodynamic devices.

16. The aerodynamic system of claim 11, wherein the lever includes a pedal that is arranged adjacent to a brake pedal and an accelerator pedal.

17. A method of controlling a manual aerodynamic system for a vehicle, comprising:

providing one or more aerodynamic devices on an exterior of a vehicle;

providing a lever in an interior of the vehicle that is communicatively coupled to the one or more aerodynamic devices;

moving the lever between a plurality of lever positions;

communicating the plurality of lever positions to one or more actuators that are communicatively coupled to the one or more aerodynamic devices; and actuating the one or more aerodynamic devices between a plurality of device positions via the one or more actuators based on the plurality of lever positions.

18. The method of claim 17, further comprising limiting actuation of the one or more actuators based on an input from a vehicle dynamics module.

19. The method of claim 17, wherein moving the lever between the plurality of lever positions further includes moving a handle arranged in the interior of the vehicle.

20. The method of claim 17, wherein moving the lever between the plurality of lever positions further includes moving a pedal arranged in the interior of the vehicle.

* * * * *